(12) United States Patent
Koito et al.

(10) Patent No.: US 9,983,444 B2
(45) Date of Patent: May 29, 2018

(54) DISPLAY DEVICE AND ELECTRONIC DEVICE

(71) Applicant: Japan Display Inc., Minato-ku (JP)

(72) Inventors: Takeo Koito, Minato-ku (JP); Yingbao Yang, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 275 days.

(21) Appl. No.: 14/858,266

(22) Filed: Sep. 18, 2015

(65) Prior Publication Data

US 2016/0091763 A1  Mar. 31, 2016

(30) Foreign Application Priority Data

Sep. 29, 2014 (JP) ................................. 2014-199236

(51) Int. Cl.
  *G02F 1/1343* (2006.01)
  *G02F 1/1335* (2006.01)
  (Continued)

(52) U.S. Cl.
  CPC ...  *G02F 1/134309* (2013.01); *G02B 27/2214* (2013.01); *G02F 1/137* (2013.01); *G02F 1/133345* (2013.01); *G02F 1/133528* (2013.01)

(58) Field of Classification Search
  None
  See application file for complete search history.

(56) References Cited

U.S. PATENT DOCUMENTS

2006/0146208 A1  7/2006 Kim
2007/0183015 A1  8/2007 Jacobs et al.
(Continued)

FOREIGN PATENT DOCUMENTS

CN  103517053 A  1/2014
JP  2001-056212 A  2/2001
(Continued)

OTHER PUBLICATIONS

Office Action dated Dec. 25, 2017, in Japanese Patent Application No. 2014-199236, filed Sep. 29, 2014, (w/English-language Translation)

(Continued)

*Primary Examiner* — Jennifer Mehmood
*Assistant Examiner* — Parul Gupta
(74) *Attorney, Agent, or Firm* — Oblon, McClelland, Maier & Neustadt, L.L.P.

(57) ABSTRACT

According to one embodiment, a display device includes a switching liquid crystal unit, a controller, and a display. The switching liquid crystal unit includes first and second polarizing layers, first and second substrate units, and a liquid crystal layer. The first substrate unit includes a first substrate provided between the polarizing layers, inner electrodes provided between the first substrate and the second polarizing layer, an insulating layer provided between the first substrate and the inner electrodes, and outer electrodes provided between the first substrate and the insulating layer. The second substrate unit includes a second substrate provided between the first substrate unit and the second polarizing layer, and a counter electrode provided between the second substrate and the first substrate unit. The liquid crystal layer is provided between the substrate units. The controller controls potentials of the electrodes. The display emits light including a parallax image.

14 Claims, 7 Drawing Sheets

(51) Int. Cl.
 G02F 1/1333 (2006.01)
 G02F 1/137 (2006.01)
 G02B 27/22 (2018.01)

(56) References Cited

U.S. PATENT DOCUMENTS

| | | | |
|---|---|---|---|
| 2009/0224646 A1* | 9/2009 | Kim | G02B 27/2214 |
| | | | 313/245 |
| 2011/0102689 A1* | 5/2011 | Chiu | G02B 27/2214 |
| | | | 349/15 |
| 2013/0229587 A1 | 9/2013 | Takama et al. | |

FOREIGN PATENT DOCUMENTS

| | | |
|---|---|---|
| JP | 2005-222587 A | 8/2005 |
| JP | 2006-189764 A | 7/2006 |
| JP | 2007-293270 A | 11/2007 |
| JP | 2013-182187 | 9/2013 |
| JP | 2013-195955 A | 9/2013 |

OTHER PUBLICATIONS

Office Action dated Feb. 8, 2018, in Chinese Patent Application No. 201510616932.3, with English-language Translation, 22 pages.

* cited by examiner

DISPLAY DEVICE AND ELECTRONIC DEVICE

CROSS-REFERENCE TO RELATED APPLICATIONS

This application is based upon and claims the benefit of priority from Japanese Patent Application No. 2014-199236, filed on Sep. 29, 2014; the entire contents of which are incorporated herein by reference.

FIELD

Embodiments described herein relate generally to a display device and an electronic device.

BACKGROUND

For example, a display device displays a three-dimensional image by combining a switching liquid crystal with a display panel that displays parallax images. It is desirable to improve the image quality of the display device.

SUMMARY OF THE INVENTION

According to one embodiment, a display device includes a switching liquid crystal unit, a controller, and a display. The switching liquid crystal unit includes a first polarizing layer, a second polarizing layer, a first substrate unit, a second substrate unit, and a liquid crystal layer. The first substrate unit includes a first substrate provided between the first polarizing layer and the second polarizing layer, the first substrate being light-transmissive and having a first surface intersecting a stacking direction, the stacking direction being from the first polarizing layer toward the second polarizing layer, a plurality of inner electrodes provided between the first substrate and the second polarizing layer and arranged in a first direction, the first direction being in the first surface, the plurality of inner electrodes being light-transmissive, an insulating layer provided between the first substrate and the plurality of inner electrodes, the insulating layer being light-transmissive, and a plurality of outer electrodes provided between the first substrate and at least a portion of the insulating layer, the plurality of outer electrodes being light-transmissive, the plurality of outer electrodes and the plurality of inner electrodes being arranged alternately without overlapping each other when projected onto the first surface. The second substrate unit includes a second substrate provided between the first substrate unit and the second polarizing layer, the second substrate being light-transmissive, and a counter electrode provided between the second substrate and the first substrate unit, the counter electrode being light-transmissive. The liquid crystal layer is provided between the first substrate unit and the second substrate unit. The controller controls potentials of the plurality of inner electrodes, the plurality of outer electrodes, and the counter electrode. The display overlaps the switching liquid crystal unit and emits light including a parallax image. The plurality of inner electrodes includes a first electrode and a second electrode. The plurality of outer electrodes includes a first middle electrode and a second middle electrode. The first middle electrode is most proximal to the first electrode among the plurality of outer electrodes. The second middle electrode is most proximal to the second electrode among the plurality of outer electrodes and different from the first middle electrode. The first middle electrode is positioned between the first electrode and the second electrode when projected onto the first surface, and the second electrode is positioned between the first middle electrode and the second middle electrode when projected onto the first surface. The controller implements a first operation in a first period. The first operation includes setting each of a first transmittance of the switching liquid crystal unit for light passing through the first electrode and a first middle transmittance of the switching liquid crystal unit for light passing through the first middle electrode to be higher than each of a second transmittance of the switching liquid crystal unit for light passing through the second electrode and a second middle transmittance of the switching liquid crystal unit for light passing through the second middle electrode.

According to another embodiment, an electronic device includes a display device. The display device includes a switching liquid crystal unit, a controller, and a display. The switching liquid crystal unit includes a first polarizing layer, a second polarizing layer, a first substrate unit, a second substrate unit, and a liquid crystal layer. The first substrate unit includes a first substrate provided between the first polarizing layer and the second polarizing layer, the first substrate being light-transmissive and having a first surface intersecting a stacking direction, the stacking direction being from the first polarizing layer toward the second polarizing layer, a plurality of inner electrodes provided between the first substrate and the second polarizing layer and arranged in a first direction, the first direction being in the first surface, the plurality of inner electrodes being light-transmissive, an insulating layer provided between the first substrate and the plurality of inner electrodes, the insulating layer being light-transmissive, and a plurality of outer electrodes provided between the first substrate and at least a portion of the insulating layer, the plurality of outer electrodes being light-transmissive, the plurality of outer electrodes and the plurality of inner electrodes being arranged alternately without overlapping each other when projected onto the first surface. The second substrate unit includes a second substrate provided between the first substrate unit and the second polarizing layer, the second substrate being light-transmissive, and a counter electrode provided between the second substrate and the first substrate unit, the counter electrode being light-transmissive. The liquid crystal layer is provided between the first substrate unit and the second substrate unit. The controller controls potentials of the plurality of inner electrodes, the plurality of outer electrodes, and the counter electrode. The display overlaps the switching liquid crystal unit and emits light including a parallax image. The plurality of inner electrodes includes a first electrode and a second electrode. The plurality of outer electrodes includes a first middle electrode and a second middle electrode. The first middle electrode is most proximal to the first electrode among the plurality of outer electrodes. The second middle electrode is most proximal to the second electrode among the plurality of outer electrodes and different from the first middle electrode. The first middle electrode is positioned between the first electrode and the second electrode when projected onto the first surface, and the second electrode is positioned between the first middle electrode and the second middle electrode when projected onto the first surface. The controller implements a first operation in a first period. The first operation includes setting each of a first transmittance of the switching liquid crystal unit for light passing through the first electrode and a first middle transmittance of the switching liquid crystal unit for light passing through the first middle electrode to be higher than each of a second transmittance of the switching liquid crystal unit for light passing through the second electrode and a second middle transmittance of the switching liquid crystal unit for light passing through the second middle electrode.

DETAILED DESCRIPTION

Figure 1:
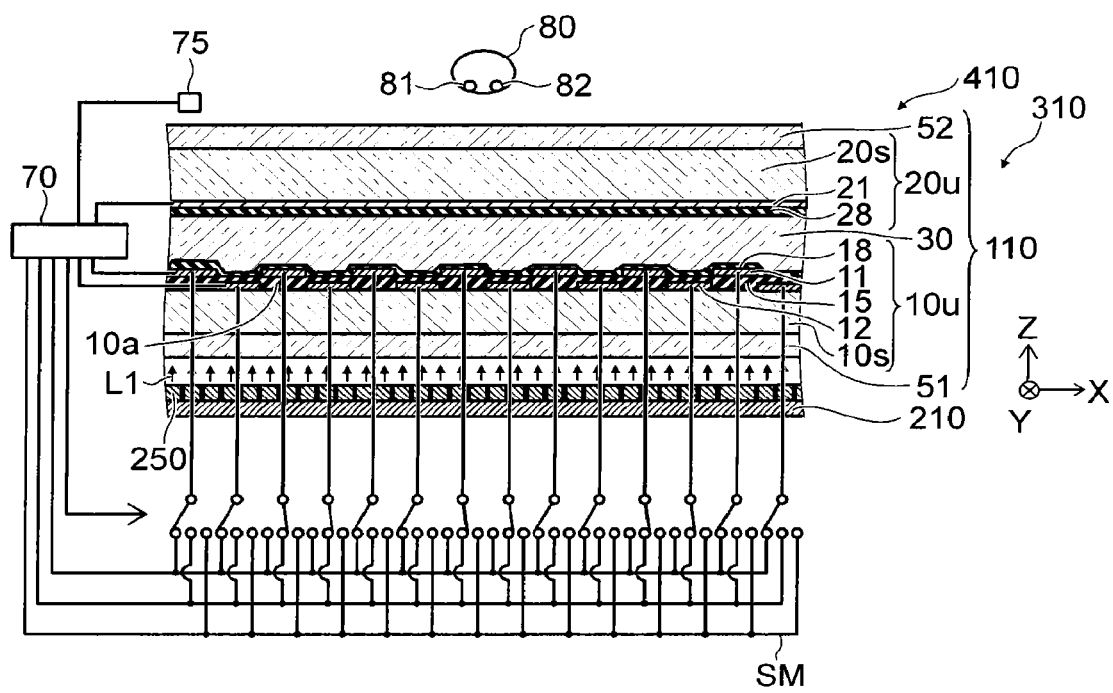
FIG. 1 is a schematic cross-sectional view illustrating a display device according to a first embodiment.

Various Embodiments will be described hereinafter with reference to the accompanying drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

Figure 12:
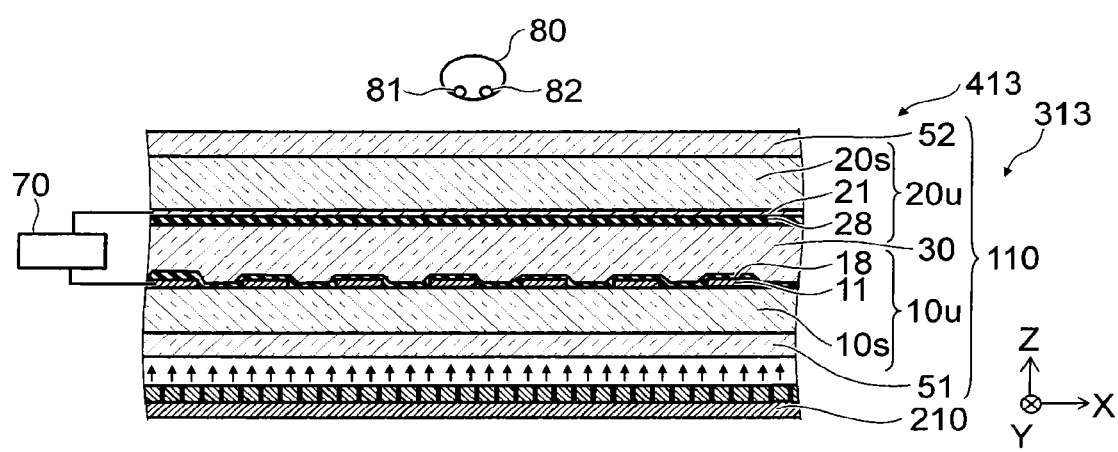
FIG. 12 is a schematic cross-sectional view illustrating a display device considered before the invention.

FIG. 12 is a schematic cross-sectional view illustrating a display device considered before the invention.

As shown in FIG. 12, the display device 313 includes a switching liquid crystal unit 110, a controller 70, and a display 210. The switching liquid crystal unit 110 and the controller 70 are included in a liquid crystal optical device 413.

For example, the switching liquid crystal unit 110 is used as a parallax barrier to generate 3-dimensional image with a display unit, includes a first substrate unit 10u, a second substrate unit 20u, a first polarizing layer 51 (e.g., a polarizing plate), and a second polarizing layer 52 (e.g., a polarizing plate), and includes a liquid crystal layer 30 between the first substrate unit 10u and the second substrate unit 20u.

The first substrate unit 10u includes a first substrate 10s, multiple inner electrodes 11, and a first alignment layer 18; and the second substrate unit 20u includes a second substrate 20s, a counter electrode 21, and a second alignment layer 28. The switching liquid crystal unit 110 functions as a parallax barrier by applying a voltage between the counter electrode 21 and the multiple inner electrodes 11; and a viewer 80 perceives a stereoscopic image by the switching liquid crystal unit 110 changing the positions of the barrier openings for a right eye 81 and a left eye 82 according to the position of the viewer 80 detected using a camera, etc.

The switching liquid crystal unit 110 is not limited to a parallax barrier and may be, for example, a liquid crystal lens. In such a case, the first polarizing layer 51 and the second polarizing layer 52 are unnecessary.

However, because a space is provided between the multiple inner electrodes 11 in the liquid crystal optical device 413, light leaks from the spaces and the crosstalk becomes large.

FIG. 1 is a schematic cross-sectional view illustrating a display device according to a first embodiment.

As shown in FIG. 1, the display device 310 according to the embodiment includes the switching liquid crystal unit 110, the controller 70, and the display 210. The switching liquid crystal unit 110 and the controller 70 are included in a liquid crystal optical device 410.

For example, the switching liquid crystal unit 110 is used as a parallax barrier or a liquid crystal lens to generate 3-dimensional image with a display unit.

The switching liquid crystal unit 110 includes the first polarizing layer 51 (e.g., a polarizing plate), the second polarizing layer 52 (e.g., a polarizing plate), the first substrate unit 10u, the second substrate unit 20u, and the liquid crystal layer 30.

A direction from the first polarizing layer 51 toward the second polarizing layer 52 is taken as a stacking direction. The stacking direction is taken as a Z-axis direction. One direction perpendicular to the Z-axis direction is taken as an X-axis direction. A direction perpendicular to the Z-axis direction and the X-axis direction is taken as a Y-axis direction.

The first substrate unit 10u includes the first substrate 10s, the multiple inner electrodes 11, an insulating layer 15, multiple outer electrodes 12, and the first alignment layer 18; the multiple outer electrodes 12 are provided at a prescribed spacing in the X-axis direction on the first substrate 10s; the insulating layer 15 is provided to cover the first substrate 10s and the multiple outer electrodes 12; the multiple inner electrodes 11 are provided at a prescribed spacing in the X-axis direction on the insulating layer 15; and the first alignment layer 18 is provided to cover the insulating layer 15 and the multiple inner electrodes 11.

The multiple outer electrodes 12 and the multiple inner electrodes 11 are arranged alternately as viewed by the viewer 80. The edge portions of the outer electrodes 12 and the inner electrodes 11 may overlap when viewed by the viewer 80; or gaps may exist as viewed by the viewer 80.

In the second substrate unit 20u, the counter electrode 21 is provided on the first substrate unit 10u side of the second substrate 20s; and the second alignment layer 28 is provided on the first substrate unit 10u side of the counter electrode 21.

The liquid crystal layer 30 is included between the first alignment layer 18 of the first substrate unit 10u and the second alignment layer 28 of the second substrate unit 20u; the first polarizing layer 51 is provided on the display 210 side of the first substrate unit 10u; and the second polarizing layer 52 is provided on the viewer 80 side of the second substrate unit 20u.

Because the multiple outer electrodes 12 and the multiple inner electrodes 11 are arranged alternately as recited above, the gap between the electrodes can be sufficiently small for a human eye so as not to perceive the crosstalk; and it is possible to reduce the crosstalk due to the light leakage.

The first substrate 10s has a first surface 10a. The first surface 10a intersects the stacking direction (the Z-axis direction). For example, the first surface 10a is parallel to the X-Y plane. The first substrate 10s is light-transmissive.

The multiple inner electrodes 11 are arranged in a first direction. The first direction is a direction inside the first surface 10a. The first direction is, for example, the X-axis direction. The multiple inner electrodes 11 are light-transmissive.

The insulating layer 15 is provided between the first substrate 10s and the multiple inner electrodes 11. The insulating layer 15 is light-transmissive.

The multiple outer electrodes 12 are provided between the first substrate 10s and at least a portion of the insulating layer 15. The multiple outer electrodes 12 are light-transmissive. The multiple outer electrodes 12 and the multiple inner electrodes 11 are arranged alternately when projected onto the first surface 10a. The multiple outer electrodes 12 and the multiple inner electrodes 11 may or may not overlap each other when projected onto the first surface 10a.

The second substrate unit 20u includes the second substrate 20s and the counter electrode 21. The second substrate 20s is provided between the first substrate unit 10u and the second polarizing layer 52. The second substrate 20s is light-transmissive.

The counter electrode 21 is provided between the second substrate 20s and the first substrate unit 10u. The counter electrode 21 is light-transmissive.

The liquid crystal layer 30 is provided between the first substrate unit 10u and the second substrate unit 20u.

At least one of the first substrate 10s or the second substrate 20s includes, for example, a glass substrate or a resin substrate.

At least one of the inner electrode 11, the outer electrode 12, or the counter electrode 21 includes, for example, an oxide including at least one element selected from the group consisting of In, Sn, Zn, and Ti. These electrodes include, for example, indium oxide (ITO).

For example, the first substrate 10s, the second substrate 20s, the inner electrodes 11, the outer electrodes 12, and the counter electrode 21 are transparent.

The insulating layer 15 includes, for example, at least one of silicon oxide, silicon nitride, silicon oxynitride, or aluminum oxide. The thickness of the insulating layer 15 is appropriately set to an optimal thickness according to the specifications, etc. In the case where the thickness is excessively thin, leaks may occur due to the inner electrodes 11 approaching the outer electrodes 12. In the case where the thickness is excessively thick, the transmittance of the insulating layer 15 decreases. Good insulative properties and good transmittance are obtained when the thickness is in the range recited above.

The liquid crystal layer 30 includes, for example, a nematic liquid crystal. The dielectric anisotropy of the liquid crystal included in the liquid crystal layer 30 may be positive or negative. The liquid crystal alignment of the liquid crystal layer 30 is arbitrary.

In the example, the first substrate unit 10u includes the first alignment layer 18; and the second substrate unit 20u includes the second alignment layer 28. The inner electrodes 11 are disposed between the first alignment layer 18 and the insulating layer 15. The counter electrode 21 is disposed between the second alignment layer 28 and the second substrate 20s. These alignment films include, for example, a polyimide resin. The liquid crystal alignment of the liquid crystal layer 30 is formed by these alignment films.

The controller 70 controls the potentials of the multiple inner electrodes 11, the multiple outer electrodes 12, and the counter electrode 21. The controller 70 controls the voltages between the counter electrode 21 and the inner electrodes 11 and the voltages between the counter electrode 21 and the outer electrodes 12.

The applied voltages are applied by the controller 70 between the counter electrode 21 and the inner electrodes 11 and between the counter electrode 21 and the outer electrodes 12. Voltages that correspond to the applied voltages are applied to the liquid crystal layer 30. A change of the liquid crystal alignment of the liquid crystal layer 30 occurs according to the voltages. The optical characteristics (e.g., the birefringence, the optical rotatory properties, etc.) of the liquid crystal layer 30 change according to the change of the liquid crystal alignment. The transmittance of the light passing through the first polarizing layer 51 and the second polarizing layer 52 changes according to the change of the optical characteristics. For example, the switching liquid crystal unit 110 functions as a light shutter.

The display 210 and the switching liquid crystal unit 110 overlap. The display 210 includes, for example, a liquid crystal display device, an organic EL display device, etc. The configuration of the display 210 is arbitrary.

The display 210 emits light L1 including parallax images. For example, multiple pixels 250 are provided in the display 210. The light L1 for the display is emitted from the multiple pixels 250. For example, the light L1 includes parallax images including an image for the right eye and an image for the left eye. The number of parallax images is arbitrary.

The light that passes through the switching liquid crystal unit 110 is incident on the viewer 80. When viewed by the right eye of the viewer 80, the switching liquid crystal unit 110 switches the positions of the light-transmitting units and the light-shielding units to transmit the light from the image for the right eye and attenuate the light of the image for the left eye. When viewed by the left eye of the viewer 80, the light-transmitting units and the light-shielding units are provided so that the switching liquid crystal unit 110 transmits the light from the image for the left eye and attenuates the light of the image for the right eye. The light-shielding unit or the light-transmitting unit is set according to the applied voltage between the counter electrode 21 and at least one of the inner electrode 11 or the outer electrode 12. For example, a normally open (normally white) configuration is used in which the state is set to the light-shielding state by applying a prescribed first voltage between the counter electrode 21 and at least one of the inner electrode 11 or the outer electrode 12, and the state is set to the light-transmitting state when a voltage is not applied or when a voltage that is lower than the first voltage is applied. Or, a normally closed (normally black) configuration may be used in which the state is set to the light-transmitting state by applying the prescribed first voltage between the counter electrode 21 and at least one of the inner electrode 11 or the outer electrode 12, and the state is set to the light-shielding state when a voltage is not applied or when a voltage that is lower than the first voltage is applied. Different images (parallax images) are incident on the left and right eyes (the right eye 81 and the left eye 82) of the viewer 80 due to the light-shielding units and the light-transmitting units. For example, the viewer 80 perceives a three-dimensional image.

As described below, the controller 70 may acquire information relating to the position of the viewer 80. For example, a sensor 75 is provided. For example, an imaging device is used as the sensor 75. A device that emits electromagnetic waves or sound waves and detects the reflected signal may be used as the sensor 75 or a camera. The sensor 75 estimates the position of the viewer 80 and supplies the controller 70 with the information relating to the position.

The controller 70 acquires information relating to the spatial arrangement between the viewer 80 and the switching liquid crystal unit 110. The spatial arrangement includes, for example, the position of the viewer 80 using the switching liquid crystal unit 110 as a reference. For example, the information relating to the spatial arrangement includes, for example, information relating to the angle between the switching liquid crystal unit 110 and the viewer 80. As described below, the controller 70 controls the operation of the switching liquid crystal unit 110 according to the acquired information.

Figure 2:
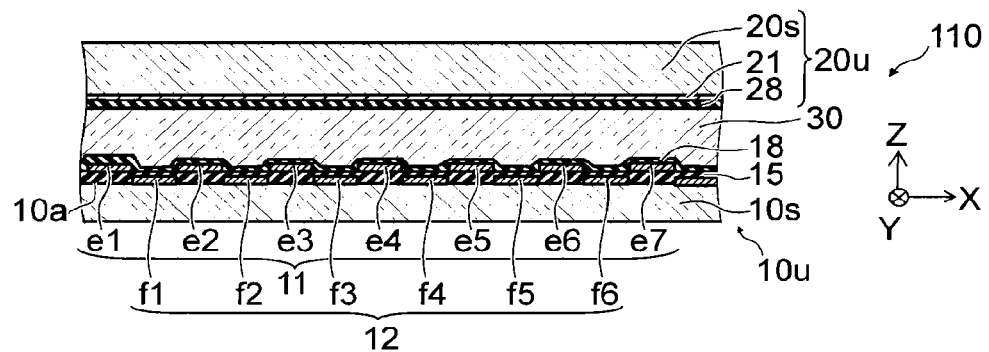
FIG. 2 is a schematic cross-sectional view illustrating a portion of the display device according to the first embodiment.

FIG. 2 is a schematic cross-sectional view illustrating a portion of the display device according to the first embodiment.

FIG. 2 illustrates a portion of the first substrate unit 10u.

For example, first to seventh electrodes e1 to e7 are provided as the multiple inner electrodes 11. For example, first to sixth middle electrodes f1 to f6 are provided as the multiple outer electrodes 12. In the example, the first to seventh electrodes e1 to e7 are arranged in order along the X-axis direction. In the example, the first to sixth middle electrodes f1 to f6 are arranged in order along the X-axis direction.

Thus, the multiple inner electrodes 11 include the first electrode e1 and the second electrode e2. The multiple outer electrodes 12 include the first middle electrode f1 and the second middle electrode f2.

The first middle electrode f1 is the electrode of the multiple outer electrodes 12 most proximal to the first electrode e1. The second middle electrode f2 is the electrode of the multiple outer electrodes 12 most proximal to the second electrode e2 and is different from the first middle electrode f1.

The first middle electrode f1 is positioned between the first electrode e1 and the second electrode e2 when projected onto the first surface 10a. The second electrode e2 is positioned between the first middle electrode f1 and the second middle electrode f2 when projected onto the first surface 10a.

In such a switching liquid crystal unit 110, the controller 70 implements a first operation in a first period. An example of the first operation will now be described.

Figure 3:
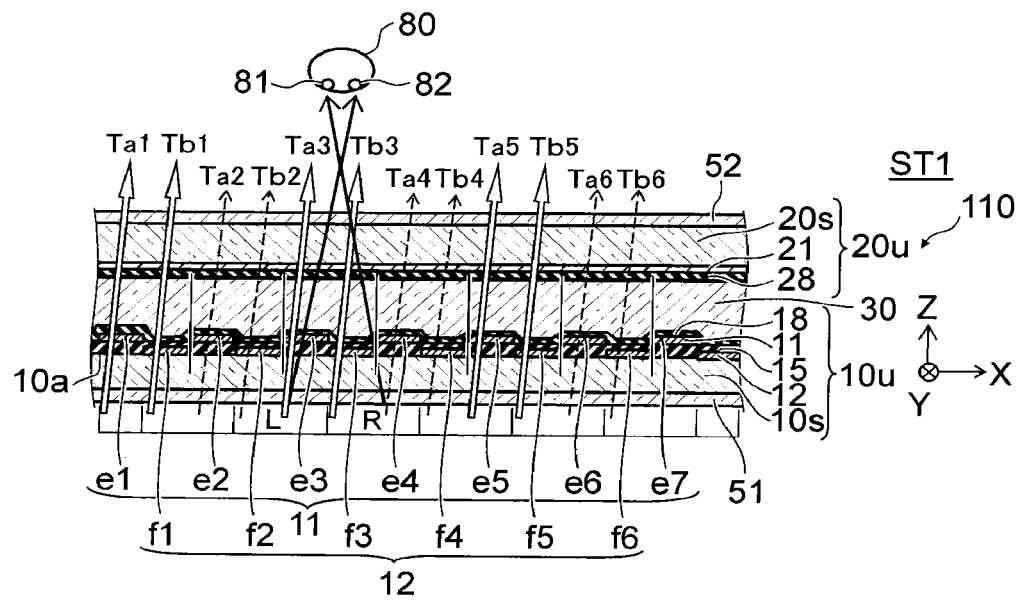
FIG. 3 is a schematic cross-sectional view illustrating an operation of the display device according to the first embodiment.

FIG. 3 is a schematic cross-sectional view illustrating an operation of the display device according to the first embodiment.

FIG. 3 illustrates the first operation ST1.

In the switching liquid crystal unit 110, first to sixth transmittances Ta1 to Ta6 are the transmittances of the switching liquid crystal unit 110 for the light passing through the first to sixth electrodes e1 to e6, respectively. First to sixth middle transmittances Tb1 to Tb6 are the transmittances of the switching liquid crystal unit 110 for the light passing through the first to sixth middle electrodes f1 to f6, respectively.

In the first operation ST1, the first transmittance Ta1, the third transmittance Ta3, and the fifth transmittance Ta5 are higher than the second transmittance Ta2, the fourth transmittance Ta4, and the sixth transmittance Ta6. In the first operation ST1, the first middle transmittance Tb1, the third middle transmittance Tb3, and the fifth middle transmittance Tb5 are higher than the second middle transmittance Tb2, the fourth middle transmittance Tb4, and the sixth middle transmittance Tb6.

In the first operation ST1, the positions that correspond to the first electrode e1, the third electrode e3, and the fifth electrode e5 are in the light-transmitting state. The positions that correspond to the second electrode e2, the fourth electrode e4, and the sixth electrode e6 are in the non-transmitting state.

In the first operation ST1, the positions that correspond to the first middle electrode f1, the third middle electrode f3, and the fifth middle electrode f5 are in the light-transmitting state. The positions that correspond to the second middle electrode f2, the fourth middle electrode f4, and the sixth middle electrode f6 are in the non-transmitting state.

The transmittance in the non-transmitting state is lower than the transmittance in the light-transmitting state. The non-transmitting state is, for example, a shielding state.

In other words, the light-transmitting units are formed at a first pair made of the first electrode e1 and the first middle electrode f1, a third pair made of the third electrode e3 and the third middle electrode f3, and a fifth pair made of the fifth electrode e5 and the fifth middle electrode f5. The light-shielding units are formed at a second pair made of the second electrode e2 and the second middle electrode f2, a fourth pair made of the fourth electrode e4 and the fourth middle electrode f4, and a sixth pair made of the sixth electrode e6 and the sixth middle electrode f6. For the voltages that are applied to the electrodes of the same pair, for example, the same potential is applied by a switch matrix SM such as that shown in FIG. 1.

For example, a first parallax light (e.g., the light including the image for the right eye) that is emitted from the display 210 is incident on the switching liquid crystal unit 110 at a first angle. For example, this light passes through the portion corresponding to one of the first pair, the third pair, or the fifth pair and is incident on the right eye 81 of the viewer 80. A second parallax light (e.g., the light including the image for the left eye) is incident on the switching liquid crystal unit 110. For example, this light is attenuated (e.g., shielded) by the portion corresponding to one of the second pair, the fourth pair, or the sixth pair and substantially is not incident on the right eye 81 of the viewer 80.

On the other hand, the second parallax light L1 (e.g., the light including the image for the left eye) emitted from the display 210 is incident on the switching liquid crystal unit 110 at a second angle. For example, this light passes through the portion corresponding to one of the first pair, the third pair, or the fifth pair and is incident on the left eye 82 of the viewer 80. The first parallax light (e.g., the light including the image for the right eye) is incident on the switching liquid crystal unit 110. For example, this light is attenuated (e.g., shielded) by the portion corresponding to one of the second pair, the fourth pair, or the sixth pair and substantially is not incident on the left eye 82 of the viewer 80.

In the first period, the position of the viewer 80 is a first position. In the first operation ST1, for example, mutually-different light can be incident on the right eye 81 and the left eye 82 of the viewer 80 at the first position. For example, a three-dimensional display is implemented by using the light L1 including the multiple parallax images.

In addition to the first operation ST1, the controller 70 may further implement a second operation in a second period. The second period is a period that is different from the first period and is after the viewer 80 moves.

Figure 4:
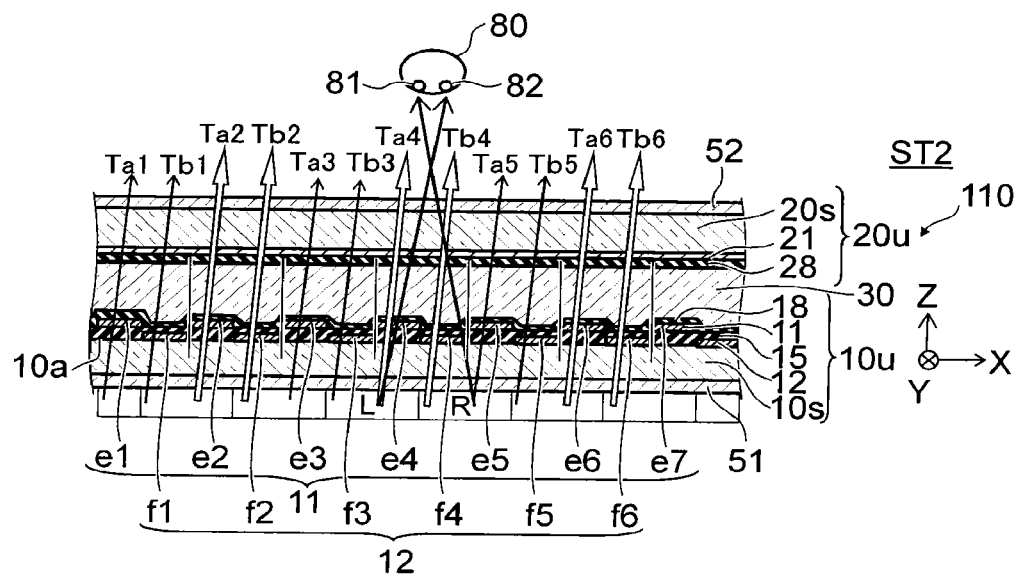
FIG. 4 is a schematic cross-sectional view illustrating an operation of the display device according to the first embodiment.

FIG. 4 is a schematic cross-sectional view illustrating an operation of the display device according to the first embodiment.

FIG. 4 illustrates a second operation ST2.

In the second operation ST2, the first transmittance Ta1, the third transmittance Ta3, and the fifth transmittance Ta5 are lower than the second transmittance Ta2, the fourth transmittance Ta4, and the sixth transmittance Ta6. In the second operation ST2, the first middle transmittance Tb1, the third middle transmittance Tb3, and the fifth middle transmittance Tb5 are lower than the second middle transmittance Tb2, the fourth middle transmittance Tb4, and the sixth middle transmittance Tb6.

In the second operation ST2, the positions that correspond to the first electrode e1, the third electrode e3, and the fifth electrode e5 are in the non-transmitting state. The positions that correspond to the second electrode e2, the fourth electrode e4, and the sixth electrode e6 are in the light-transmitting state.

In the second operation ST2, the positions that correspond to the first middle electrode f1, the third middle electrode f3, and the fifth middle electrode f5 are in the non-transmitting state. The positions that correspond to the second middle electrode f2, the fourth middle electrode f4, and the sixth middle electrode f6 are in the light-transmitting state.

In other words, the light-shielding units are formed at the first pair made of the first electrode e1 and the first middle electrode f1, the third pair made of the third electrode e3 and the third middle electrode f3, and the fifth pair made of the fifth electrode e5 and the fifth middle electrode f5. The light-transmitting units are formed at the second pair made of the second electrode e2 and the second middle electrode f2, the fourth pair made of the fourth electrode e4 and the fourth middle electrode f4, and the sixth pair made of the sixth electrode e6 and the sixth middle electrode f6. For example, for the voltages that are applied to the electrodes of the same pair, the same potential is applied by the switch matrix SM such as that shown in FIG. 1.

For example, the first parallax light (e.g., the light including the image for the right eye) that is emitted from the display 210 is incident on the switching liquid crystal unit 110 at a third angle. For example, this light passes through the portion corresponding to one of the second pair, the fourth pair, or the sixth pair and is incident on the right eye 81 of the viewer 80. The second parallax light (e.g., the light including the image for the left eye) is incident on the switching liquid crystal unit 110. For example, this light is attenuated (e.g., shielded) by the portion corresponding to one of the first pair, the third pair, or the fifth pair and substantially is not incident on the right eye 81 of the viewer 80.

On the other hand, the second parallax light L1 (e.g., the light including the image for the left eye) emitted from the display 210 is incident on the switching liquid crystal unit 110 at a fourth angle. For example, this light passes through the portion corresponding to one of the second pair, the fourth pair, or the sixth pair and is incident on the left eye 82 of the viewer 80. The first parallax light (e.g., the light including the image for the right eye) is incident on the switching liquid crystal unit 110. For example, this light is attenuated (e.g., shielded) by the portion corresponding to one of the first pair, the third pair, or the fifth pair and substantially is not incident on the left eye 82 of the viewer 80.

In the second period, the position of the viewer 80 is a second position that is different from the first position. In the second operation ST2, for example, mutually-different light can be incident on the right eye 81 and the left eye 82 of the viewer 80 at the second position. For example, a three-dimensional display is implemented by using the light L1 including the multiple parallax images.

Thus, the controller 70 further implements the second operation ST2 in the second period that is different from the first period. The second operation ST2 includes setting the second transmittance Ta2 and the second middle transmittance Tb2 to be higher than the first transmittance Ta1 and the first middle transmittance Tb1.

For example, the head of the viewer 80 moves. Or, for example, the angle of the switching liquid crystal unit 110 (or the display device 310) is modified. The spatial arrangement between the switching liquid crystal unit 110 and the viewer 80 changes.

The controller 70 acquires the information relating to the spatial arrangement between the viewer 80 and the switching liquid crystal unit 110. For example, the controller 70 implements the first operation ST1 when the arrangement based on the acquired information is in the first state (the first position) and implements the second operation ST2 when the arrangement is in the second state (the second position) that is different from the first state.

By the first operation ST1 and the second operation ST2, it is possible to perform a tracking operation that tracks the change of the spatial arrangement between the viewer 80 and the switching liquid crystal unit 110.

Although two continuous electrodes are used as one pair in FIG. 3 and FIG. 4, the number of electrodes of one "pair" is not limited to two; and it is sufficient to use at least one electrode continuous in the X-axis direction.

In the embodiment, the multiple outer electrodes 12 and the multiple inner electrodes 11 may or may not overlap each other when projected onto the first surface 10a. In the case where the multiple outer electrodes 12 and the multiple inner electrodes 11 overlap each other when projected onto the first surface 10a, there are cases where the effects of capacitive coupling between the inner electrodes 11 and the outer electrodes 12 becomes large; distortion of the signals supplied to these electrodes from the controller 70 occurs; and the image quality decreases.

In the embodiment in such a case, a configuration may be used in which the multiple outer electrodes 12 and the multiple inner electrodes 11 do not overlap each other when projected onto the first surface 10a. Thereby, the capacitive coupling can be suppressed; the desired operations can be implemented; and a high quality display device can be provided.

On the other hand, for example, in the case where the inner electrodes 11 are provided but the outer electrodes 12 are not provided as shown in FIG. 12, regions occur between the multiple inner electrodes 11 where the transmittance does not change. Therefore, for example, the contrast decreases. Or, the brightness decreases.

It is also possible to provide the inner electrodes 11 and provide light-shielding layers between the multiple inner electrodes 11 without providing the outer electrodes 12. In such a case, the brightness decreases.

Conversely, in the switching liquid crystal unit 110 according to the embodiment, the multiple inner electrodes 11 and the multiple outer electrodes 12 are provided alternately. Thereby, the light leakage is reduced; and the crosstalk is reduced.

In the embodiment, it is favorable for the distance from one of the multiple inner electrodes 11 to the outer electrode 12 adjacent to the one of the multiple inner electrodes 11 to be short when projected onto the first surface 10a. For example, it is favorable for the distance (the gap) in the first direction (e.g., the X-axis direction) between the first electrode e1 and the first middle electrode f1 to be not more than 1/10 of the width in the first direction of the first electrode e1 when projected onto the first surface 10a. Thereby, there is substantially no gap between the inner electrode 11 and the outer electrode 12; and regions do not occur where the transmittance substantially does not change. There is a tendency for the electric field that extends from the edge of the electrode to spread at the edge of the electrode. Therefore, if the distance (the gap) between the first electrode e1 and the first middle electrode f1 is 1/10 of the width of the first electrode e1 or less, the effects of the gap substantially can be ignored.

For example, it is more favorable for the distance in the first direction between the first electrode e1 and the first middle electrode f1 to be not more than 1/20 of the width in the first direction of the first electrode e1 when projected onto the first surface 10a.

The first operation ST1 includes setting the absolute value (a first absolute value) of the potential difference between the first electrode e1 and the counter electrode 21 and the absolute value (a first middle absolute value) of the potential difference between the first middle electrode f1 and the counter electrode 21 to be greater than the absolute value (a second absolute value) of the potential difference between the second electrode e2 and the counter electrode 21 and the absolute value (a second middle absolute value) of the potential difference between the second middle electrode f2 and the counter electrode 21. For example, in the first operation ST1, the voltages that are applied to the first electrode e1 and the first middle electrode f1 in the light-transmitting state are higher than the voltages applied to the second electrode e2 and the second middle electrode f2 in the non-transmitting state when the counter electrode 21 is used as the reference. A normally closed operation is implemented.

In the case where the normally closed operation is implemented, the second operation ST2 includes setting the second absolute value and the second middle absolute value to be greater than the first absolute value and the first middle absolute value.

On the other hand, the first operation ST1 includes setting the absolute value (the first absolute value) of the potential difference between the first electrode e1 and the counter electrode 21 and the absolute value (the first middle absolute value) of the potential difference between the first middle electrode f1 and the counter electrode 21 to be less than the absolute value (the second absolute value) of the potential difference between the second electrode e2 and the counter electrode 21 and the absolute value (the second middle absolute value) of the potential difference between the second middle electrode f2 and the counter electrode 21. For example, in the first operation ST1, the voltages that are applied to the first electrode e1 and the first middle electrode f1 in the light-transmitting state are lower than the voltage applied to the second electrode e2 and the second middle electrode f2 in the non-transmitting state when the counter electrode 21 is used as the reference. A normally open operation is implemented.

In the case where the normally open operation is implemented, the second operation ST2 includes setting the second absolute value and the second middle absolute value to be less than the first absolute value and the first middle absolute value.

For example, normally closed and normally open can be modified by modifying the relationship between the polarizing axis of the first polarizing layer 51 and the polarizing axis of the second polarizing layer 52. The relationship between the voltage and the transmittance can be modified by the dielectric anisotropy of the liquid crystal used in the liquid crystal layer 30.

Figure 5:
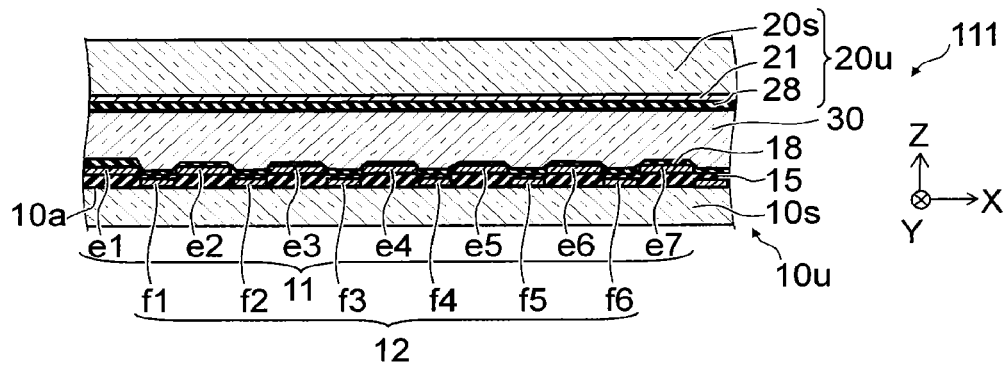
FIG. 5 is a schematic cross-sectional view illustrating a portion of the display device according to the first embodiment.

FIG. 5 is a schematic cross-sectional view illustrating a portion of the display device according to the first embodiment.

FIG. 5 shows another example of the first substrate unit 10u.

In a switching liquid crystal unit 111 as shown in FIG. 5, the width in the first direction (the X-axis direction) of each of the multiple inner electrodes 11 is wider than the width in the first direction of each of the multiple outer electrodes 12.

For example, the switching liquid crystal unit 111 is used as a parallax barrier or a liquid crystal lens to generate 3-dimensional image with a display unit.

The insulating layer 15 is not provided between the liquid crystal layer 30 and the inner electrodes 11. Conversely, the insulating layer 15 is provided between the liquid crystal layer 30 and the outer electrodes 12. A voltage drop occurs due to the insulating layer 15 for the voltages applied between the counter electrode 21 and the outer electrodes 12. In the case where the potential differences (the voltages) between the counter electrode 21 and the inner electrodes 11 are the same as the potential differences (the voltages) between the counter electrode 21 and the outer electrodes 12, a difference occurs between the voltages effectively applied to the liquid crystal layer 30 in these regions. There are cases where differences occur between the transmittances in the regions corresponding to the inner electrodes 11 and the regions corresponding to the outer electrodes 12.

In such a case, in the switching liquid crystal unit 111, the width of the inner electrodes 11 is set to be wider than the width of the outer electrodes 12. Thereby, the effect of the inner electrodes 11 is greater than the effect of the outer electrodes 12 because the effective surface area of the inner electrodes 11 is larger. Thereby, even in the case where the difference occurs between the transmittances in the regions corresponding to the inner electrodes 11 and the regions corresponding to the outer electrodes 12 due to the voltage drop, the switching liquid crystal operation as an entirety is implemented more uniformly; and it is possible to further suppress uneven luminance. Accordingly, the crosstalk can be smaller; and a display having higher image quality can be implemented.

For example, the width in the first direction of each of the multiple inner electrodes 11 is not less than 1.1 times and not more than 10 times the width in the first direction of each of the multiple outer electrodes 12. Or, the width in the first direction of each of the multiple inner electrodes 11 may be not less than 1.2 times and not more than 5 times the width in the first direction of each of the multiple outer electrodes 12. Higher image quality is obtained by setting the width of the inner electrodes 11 to be wider than the width of the outer electrodes 12 in such a range. In the case where the ratio of the width of the inner electrodes 11 to the width of the outer electrodes 12 is excessively high, the width of the outer electrodes 12 becomes excessively fine; and resistance becomes high.

As recited above, a voltage drop occurs due to the insulating layer 15 for the voltages applied between the counter electrode 21 and the outer electrodes 12. To compensate for the voltage drop, the voltages that are supplied to the inner electrodes 11 may be set to be different from the voltages supplied to the outer electrodes 12.

For example, in a normally closed operation, in the first operation ST1, the first middle absolute value that corresponds to the first middle electrode f1 is set to be greater than the first absolute value corresponding to the first electrode e1. In the second operation ST2, the second middle absolute value that corresponds to the second middle electrode f2 is set to be greater than the second absolute value corresponding to the second electrode e2. The effect of the voltage drop is compensated.

For example, in a normally open operation, in the first operation ST1, the second middle absolute value that corresponds to the second middle electrode f2 is set to be greater than the second absolute value corresponding to the second electrode e2. In the second operation ST2, the first middle absolute value that corresponds to the first middle electrode f1 is set to be greater than the first absolute value corresponding to the first electrode e1. The effect of the voltage drop is compensated.

In the example shown in FIG. 2 to FIG. 4, the light-transmitting state and the non-transmitting state are formed alternately at the inner electrodes 11. In the embodiment, for example, the light-transmitting state and the non-transmitting state may be formed alternately using a set of two inner electrodes 11 as a unit.

In the example shown in FIG. 2 to FIG. 4, the second electrode e2 is the electrode of the multiple inner electrodes 11 most proximal to the first electrode e1. In the embodiment, another inner electrode 11 may be disposed between the first electrode e1 and the second electrode e2.

Figure 6A:
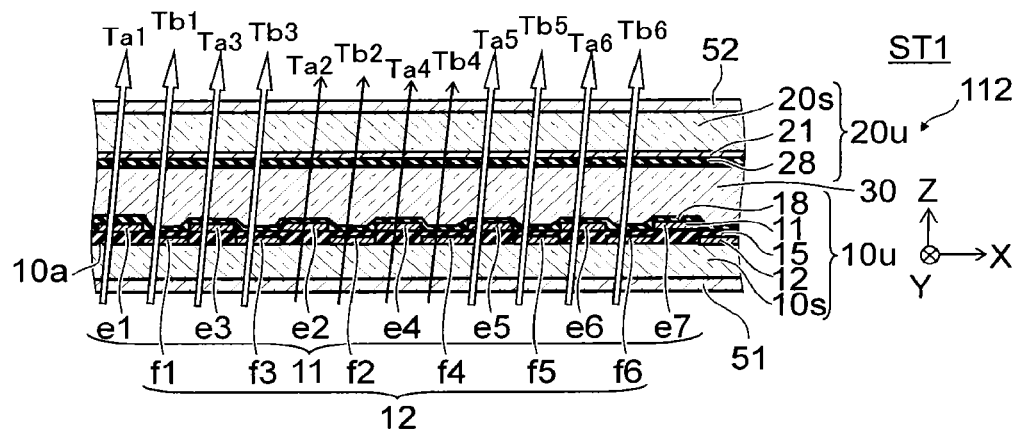
FIG. 6A and FIG. 6B are schematic cross-sectional views illustrating a portion of the display device according to the first embodiment.
Figure 6B:
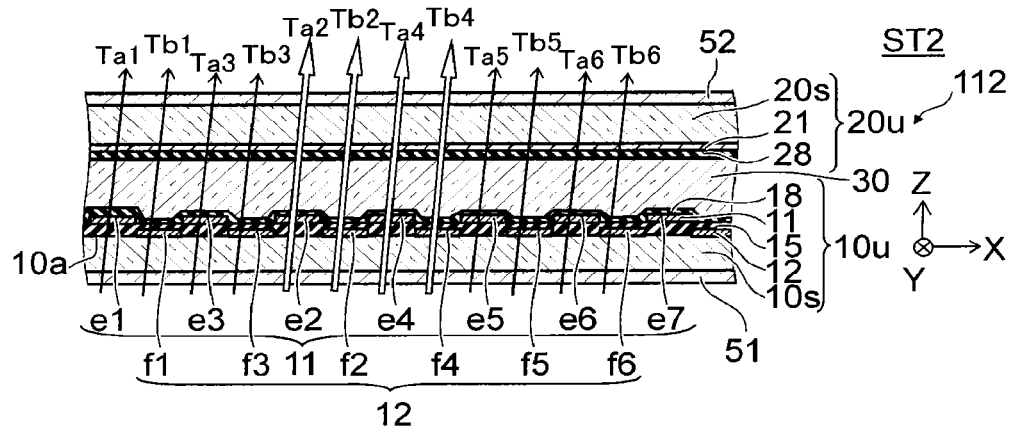

FIG. 6A and FIG. 6B are schematic cross-sectional views illustrating a portion of the display device according to the first embodiment.

FIG. 6A corresponds to the first operation ST1; and FIG. 6B corresponds to the second operation ST2. For example, a switching liquid crystal unit 112 is used as a parallax barrier or a liquid crystal lens to generate 3-dimensional image with a display unit. In a switching liquid crystal unit 112 as shown in FIG. 6A, the multiple inner electrodes 11 include the third electrode e3 in addition to the first electrode e1 and the second electrode e2. The third electrode e3 is provided between the first electrode e1 and the second electrode e2. In the example, the inner electrode 11 that is provided between the first electrode e1 and the second electrode e2 is called the third electrode e3.

The multiple outer electrodes 12 include the third middle electrode f3 in addition to the first middle electrode f1 and the second middle electrode f2. The third middle electrode f3 is the electrode of the multiple outer electrodes 12 most proximal to the third electrode e3. The third middle electrode f3 is different from the first middle electrode f1 and different from the second middle electrode f2.

The first middle electrode f1 is positioned between the first electrode e1 and the third electrode e3 when projected onto the first surface 10a. The third electrode e3 is positioned between the first middle electrode f1 and the third middle electrode f3 when projected onto the first surface 10a.

In the first operation ST1, the third transmittance Ta3 of the switching liquid crystal unit 112 for the light passing through the third electrode e3 and the third middle transmittance Tb3 of the switching liquid crystal unit 112 for the light passing through the third middle electrode f3 are set to be higher than the second transmittance Ta2 and the second middle transmittance Tb2.

For example, in the first operation ST1, the light-transmitting state is formed at the first pair made of the first electrode e1 and the first middle electrode f1. The light-transmitting state is formed at the third pair made of the third electrode e3 and the third middle electrode f3. Thereby, a region that is continuous in the first direction (the X-axis direction) and corresponds to the first electrode e1, the first middle electrode f1, the third electrode e3, and the third middle electrode f3 is in the light-transmitting state.

In the first operation ST1, the non-transmitting state is formed at the second pair made of the second electrode e2 and the second middle electrode f2. The non-transmitting state is formed at the fourth pair made of the fourth electrode e4 and the fourth middle electrode f4. Thereby, a region that is continuous in the first direction (the X-axis direction) and corresponds to the second electrode e2, the second middle electrode f2, the fourth electrode e4, and the fourth middle electrode f4 is in the non-transmitting state (the light-shielding state).

In the first operation ST1, the light-transmitting state is formed at the fifth pair made of the fifth electrode e5 and the fifth middle electrode f5. The light-transmitting state is formed at the sixth pair made of the sixth electrode e6 and the sixth middle electrode f6. Thereby, a region that is continuous in the first direction (the X-axis direction) and corresponds to the fifth electrode e5, the fifth middle electrode f5, the sixth electrode e6, and the sixth middle electrode f6 is in the light-transmitting state.

In the switching liquid crystal unit 112, the light-transmitting state and the non-transmitting state are formed alternately using two pairs as a unit.

On the other hand, as shown in FIG. 6B, the second operation ST2 includes setting the second transmittance Ta2 and the second middle transmittance Tb2 to be higher than the third transmittance Ta3 and the third middle transmittance Tb3.

In the second operation ST2, for example, the non-transmitting state is formed at the first pair, the third pair, the fifth pair, and the sixth pair. The light-transmitting state is formed at the second pair and the fourth pair.

Further, in the embodiment, the light-transmitting state and the non-transmitting state may be formed alternately using, for example, three sets of inner electrodes as a unit.

Here, without limiting this, in the second operation, the light-transmitting state may be sequentially shifted by one pair unit so as to set e3, f3, e2, f2 to be in the light-transmitting state and set e4, f4, e5, f5 to be in the light-shielding state depending on a moving position of the viewer, alternately an arbitrary position may be switched between the light-transmitting state and the light-shielding state.

Figure 7A:
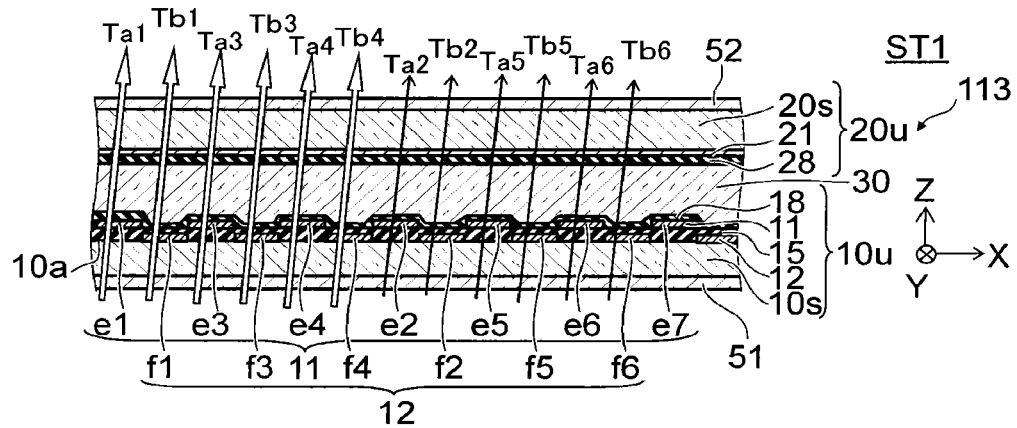
FIG. 7A and FIG. 7B are schematic cross-sectional views illustrating a portion of the display device according to the first embodiment.
Figure 7B:
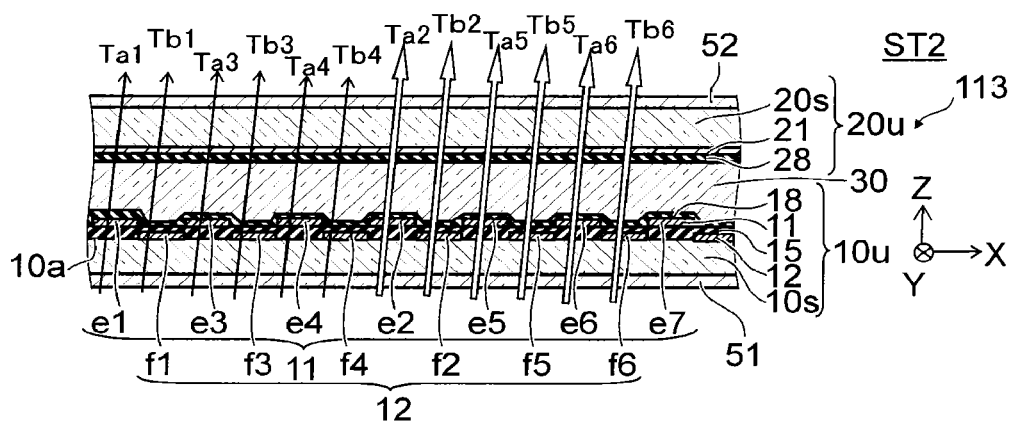

FIG. 7A and FIG. 7B are schematic cross-sectional views illustrating a portion of the display device according to the first embodiment.

FIG. 7A corresponds to the first operation ST1; and FIG. 7B corresponds to the second operation ST2.

For example, a switching liquid crystal unit 113 is used as a parallax barrier or a liquid crystal lens to generate 3-dimensional image with a display unit. In a switching liquid crystal unit 113 as shown in FIG. 7A, the multiple inner electrodes 11 include the third electrode e3 and the fourth electrode e4 in addition to the first electrode e1 and the second electrode e2. The third electrode e3 is provided between the first electrode e1 and the second electrode e2. The fourth electrode e4 is provided between the third electrode e3 and the second electrode e2.

The multiple outer electrodes 12 include the fourth middle electrode f4 in addition to the first middle electrode f1, the second middle electrode f2, and the third middle electrode f3. The fourth middle electrode f4 is the electrode of the multiple outer electrodes 12 most proximal to the fourth electrode e4. The fourth middle electrode f4 is different from the third middle electrode f3 and different from the second middle electrode f2.

The third middle electrode f3 is positioned between the third electrode e3 and the fourth electrode e4 when projected onto the first surface 10a. The fourth electrode e4 is positioned between the third middle electrode f3 and the fourth middle electrode f4 when projected onto the first surface 10a.

The first operation ST1 includes setting the fourth transmittance Ta4 of the switching liquid crystal unit 113 for the light passing through the fourth electrode e4 and the fourth middle transmittance Tb4 of the switching liquid crystal unit 113 for the light passing through the fourth middle electrode f4 to be higher than the second transmittance Ta2 and the second middle transmittance Tb2.

In the first operation ST1, for example, the light-transmitting state is formed at the first pair, the third pair, and the fourth pair. The non-transmitting state is formed at the second pair, the fifth pair, and the sixth pair.

As shown in FIG. 7B, the second operation ST2 includes setting the second transmittance Ta2 and the second middle transmittance Tb2 to be higher than the fourth transmittance Ta4 and the fourth middle transmittance Tb4.

In the second operation ST2, for example, the non-transmitting state is formed at the first pair, the third pair, and the fourth pair. The light-transmitting state is formed at the second pair, the fifth pair, and the sixth pair.

In the embodiment, when the light-transmitting state and the non-transmitting state are formed alternately, the number of inner electrodes 11 inside the set that is set to the light-transmitting state is arbitrary. The number of inner electrodes 11 inside the set that is set to the non-transmitting state is arbitrary.

Here, without limiting this, in the second operation, the light-transmitting state may be sequentially shifted by one pair unit or by two pairs so as to set e3, e4, e2, f3, f4, f2 to be in the light-transmitting state and set e2, f2, e5, e6, e7, f5, f6, f7 to be in the light-shielding state depending on a moving position of the viewer, alternately an arbitrary position may be switched between the light-transmitting state and the light-shielding state.

In FIG. 6A, FIG. 6B, FIG. 7A, and FIG. 7B, the width of the electrode in the first direction (the X-axis direction) for the first to sixth middle electrodes f2 to f6 may be narrower than the electrode width in the first direction (the X-axis direction) for the first to seventh electrodes e2 to e7. In such a case, similarly to FIG. 5, the uneven luminance is suppressed further; the crosstalk can be smaller; and it is possible to realize high image quality.

By modifying the widths of the continuous light-transmitting units and light-shielding units as in FIG. 6A, FIG. 6B, FIG. 7A, and FIG. 7B, it is possible for the viewer 80 to perceive the display as a stereoscopic display even when the distance between the viewer 80 and the display device 310 changes. The distance between the viewer 80 and the display device 310 may be determined by analyzing an image of an imaging device (the sensor 75) or may be measured using electromagnetic waves, ultrasonic waves, etc.

Figure 8:
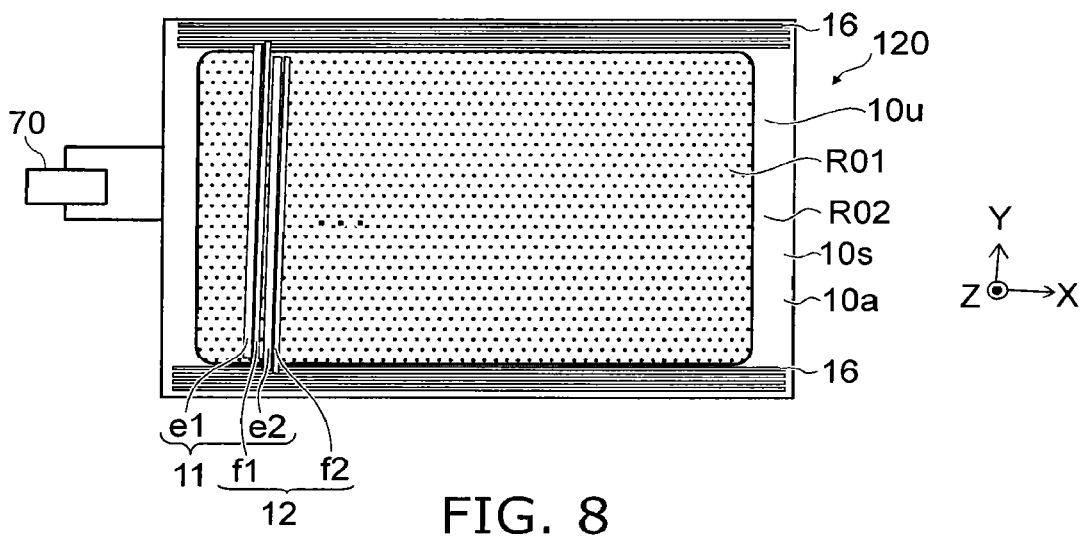
FIG. 8 is a schematic plan view illustrating a portion of the display device according to the first embodiment.

FIG. 8 is a schematic plan view illustrating a portion of the display device according to the first embodiment.

FIG. 8 illustrates the first substrate unit 10u. In a switching liquid crystal unit 120 according to the embodiment, the first substrate unit 10u includes a display area (a central unit) R01 and a peripheral area R02. The peripheral area R02 is positioned on the outer side of the display area R01 inside the first surface 10a. The inner electrodes 11 and the outer electrodes 12 are provided in the display area R01.

Multiple interconnects 16 may be further provided in the first substrate unit 10u. In the example, the interconnects 16 are provided in the peripheral area R02. One of the multiple interconnects 16 electrically connects the controller 70 to one of the multiple inner electrodes 11. One of the multiple interconnects 16 electrically connects the controller 70 to one of the multiple outer electrodes 12. The signals (the voltages) that are supplied to the inner electrodes 11 and the outer electrodes 12 are supplied to the interconnects 16.

For example, the interconnects 16 are provided between the first substrate 10s and the second polarizing layer 52. The sheet resistance of each of the multiple interconnects 16 is lower than the sheet resistance of each of the multiple inner electrodes 11 and lower than the sheet resistance of each of the multiple outer electrodes 12. The interconnects 16 include, for example, a metal. By using the interconnects 16, the voltage drop due to the resistance can be suppressed; and the nonuniformity of the voltages of the inner electrodes 11 and the outer electrodes 12 can be suppressed.

Figure 9:
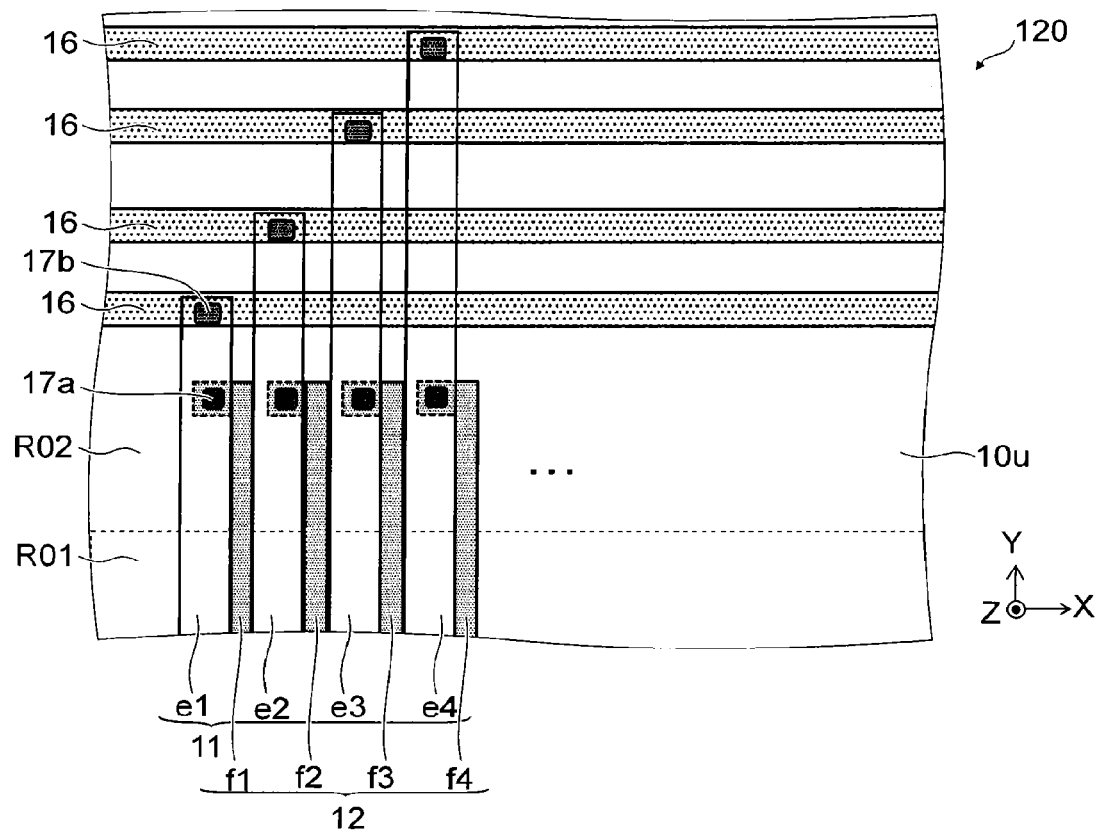
FIG. 9 is a schematic plan view illustrating a portion of the display device according to the first embodiment.

FIG. 9 is a schematic plan view illustrating a portion of the display device according to the first embodiment.

FIG. 9 illustrates an end portion region of the first substrate unit 10u.

One of the multiple interconnects 16 is electrically connected to one of the multiple inner electrodes 11 (the first electrode e1 or the like). One of the multiple interconnects 16 is electrically connected to one of the multiple outer electrodes 12 (the first middle electrode f1 or the like). For example, the interconnects 16 are connected to the inner electrodes 11 by connectors 17b.

In the example, the first substrate unit 10u includes multiple connectors 17a. The multiple connectors 17a are provided in the peripheral area R02. A configuration may be used in which one of the multiple connectors 17a electrically connects one of the multiple outer electrodes 12 (e.g., the first middle electrode f1) to one of the multiple inner electrodes 11 (e.g., the first electrode e1) and it is possible to appropriately switch the connection state by providing a switch. In the example, one of the multiple outer electrodes 12 is electrically connected to one of the multiple inner electrodes 11.

As described above, in the case where the potential of the first electrode e1 is set to be different from the potential of the first middle electrode f1, a configuration is used in which the first electrode e1 is not electrically connected to the first middle electrode f1 and, for example, different voltages are applied by switching multiple power supply lines using the switch matrix SM as shown in FIG. 1.

In the embodiment as shown in FIG. 9, each of the multiple inner electrodes 11 extends along a second direction (the Y-axis direction); and each of the multiple outer electrodes 12 extends along the second direction. The second direction intersects the first direction (the X-axis direction).

Figure 10:
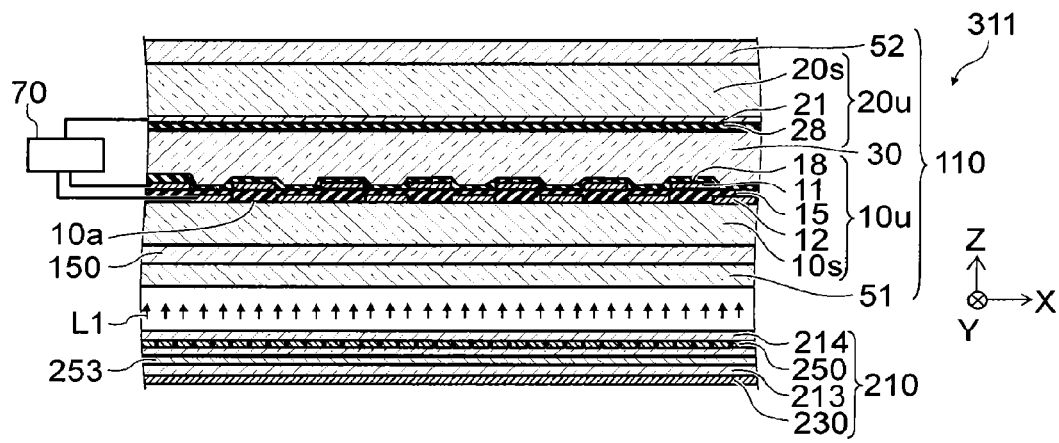
FIG. 10 is a schematic cross-sectional view illustrating another display device according to the first embodiment.

FIG. 10 is a schematic cross-sectional view illustrating another display device according to the first embodiment.

In the display device 311 as shown in FIG. 10, the display 210 includes a third substrate 213, a fourth substrate 214, a third polarizing layer 253, and a backlight 230. For example, the multiple pixels 250 are formed by disposing multiple pixel electrodes and a liquid crystal layer between the third substrate 213 and the fourth substrate 214. The third substrate 213 and the fourth substrate 214 are disposed between the backlight 230 and the switching liquid crystal unit 110. The third polarizing layer 253 is disposed between the backlight 230 and the third substrate 213.

The display of the display 210 is performed using the first polarizing layer 51 and the third polarizing layer 253. In the example, an optical layer 150 is further provided. The optical layer 150 is disposed between the first polarizing layer 51 and the first substrate 10s. The optical layer 150 is, for example, an optical anisotropic layer. For example, the control of the viewing angle direction is performed.

Figure 11:
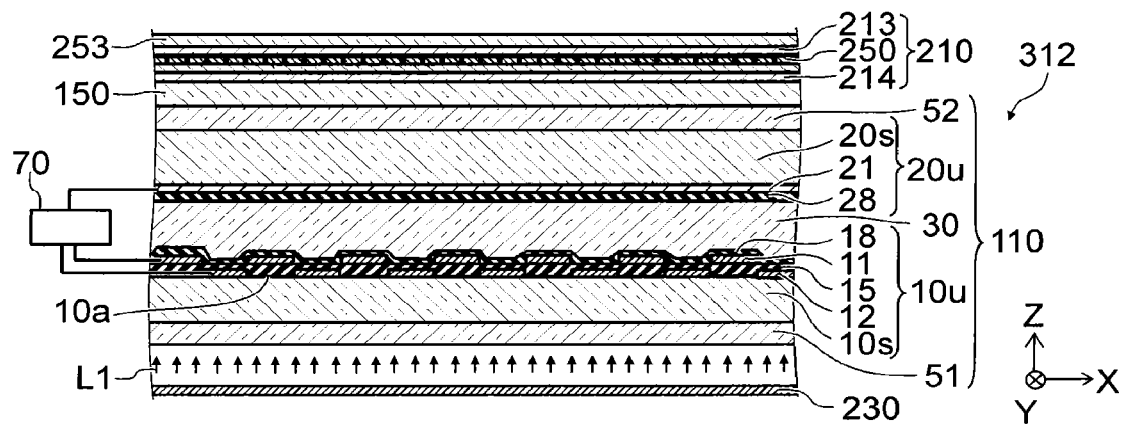
FIG. 11 is a schematic cross-sectional view illustrating another display device according to the first embodiment.

FIG. 11 is a schematic cross-sectional view illustrating another display device according to the first embodiment.

In the display device 312 as shown in FIG. 11, the switching liquid crystal unit 110 is disposed between the backlight 230 and the display 210.

The switching liquid crystal units 110 to 113 and 120 according to the embodiment and modifications of the switching liquid crystal units 110 to 113 and 120 are used as the display devices 310 to 312 according to the embodiment and modifications of the display devices 310 to 312.

The embodiment includes the liquid crystal optical device 410 (referring to the drawings). The liquid crystal optical device 410 includes the controller 70 and one of the switching liquid crystal units according to the embodiment.

The switching liquid crystal unit may include the configurations described above and modifications of the configurations described above.

The controller 70 performs the first operation ST1 in the first period. The first operation ST1 includes setting the first transmittance Ta1 of the switching liquid crystal unit for the light passing through the first electrode e1 and the first middle transmittance Tb1 of the switching liquid crystal unit for the light passing through the first middle electrode f1 to be higher than the second transmittance Ta2 of the switching liquid crystal unit for the light passing through the second electrode e2 and the second middle transmittance Tb2 of the switching liquid crystal unit for the light passing through the second middle electrode f2.

The controller 70 may further implement the second operation ST2. The second operation ST2 includes setting the second transmittance Ta2 and the second middle transmittance Tb2 to be higher than the first transmittance Ta1 and the first middle transmittance Tb1.

According to the liquid crystal optical device 410, a high quality display device can be provided.

Figure 13:
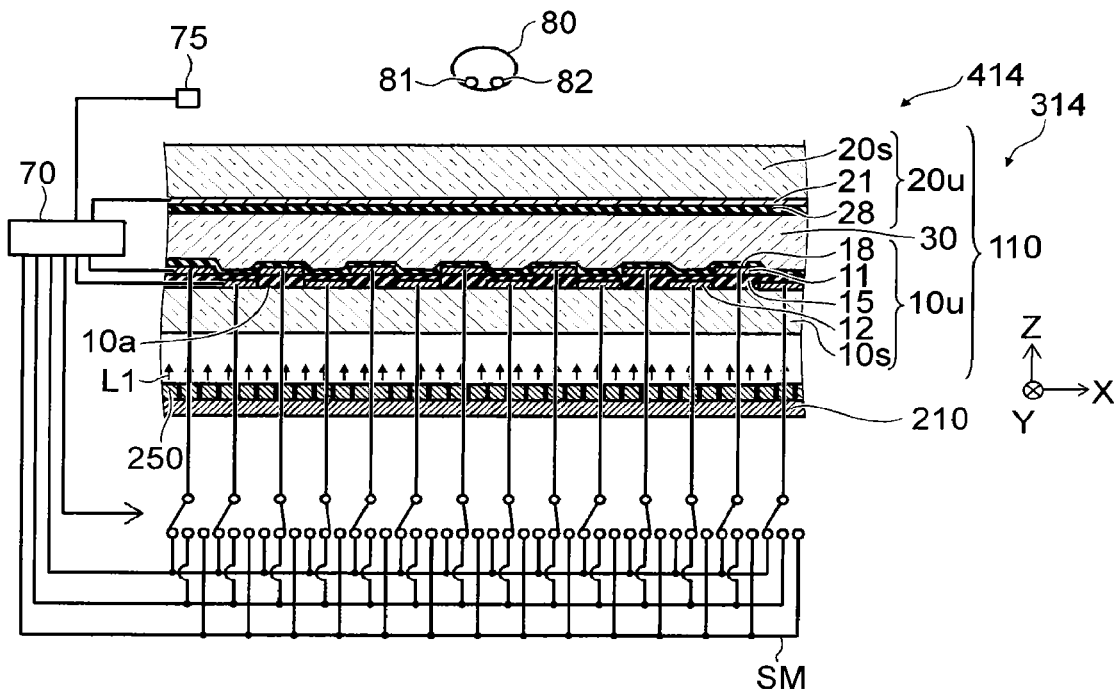
FIG. 13 is a schematic cross-sectional view illustrating another display device according to the first embodiment.

FIG. 13 is a schematic cross-sectional view illustrating another display device according to the first embodiment.

In the example of FIG. 13, the display device according to the embodiment is used in a liquid crystal lens. The display device 314 includes the switching liquid crystal unit 110, the controller 70, and the display 210. The switching liquid crystal unit 110 and the controller 70 are included in a liquid crystal optical device 414. The configuration is unlike FIG. 1 in that the first polarizing layer 51 and the second polarizing layer 52 are not provided; and it is possible to form the liquid crystal lens in the liquid crystal layer 30 by applying different prescribed voltages to the first to sixth electrodes e1 to e6 included in the multiple inner electrodes 11 and the first to sixth middle electrodes f1 to f6 included in the multiple outer electrodes 12.

In such a case as well, because the multiple inner electrodes 11 and the multiple outer electrodes 12 are arranged alternately, the light leakage is suppressed; and it is possible to suppress the crosstalk.

By setting the width in the first direction (the X-axis direction) of the multiple inner electrodes 11 to be wider than the width in the first direction (the X-axis direction) of the multiple outer electrodes 12, the effective surface area of the inner electrodes 11 is increased; and it is possible to suppress the uneven luminance.

Second Embodiment

Figure 14:
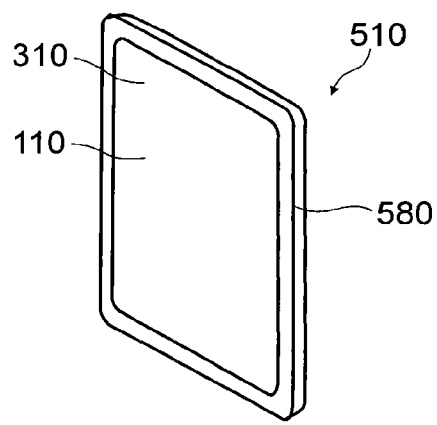
FIG. 14 is a schematic perspective view illustrating an electronic device according to a second embodiment.

FIG. 14 is a schematic perspective view illustrating an electronic device according to a second embodiment.

As shown in FIG. 14, the electronic device 510 according to the embodiment includes the display device 310. The display device includes any display device according to the embodiment recited above and its modifications. A housing 580 is provided in the electronic device 510. The controller 70 is contained in the housing 580. The light from the switching liquid crystal unit 110 is emitted from an opening of the housing 580.

According to the embodiments, a display device and an electronic device having high quality can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in display devices such as switching liquid crystal units, polarizing layers, substrate units, substrates, electrodes, counter electrodes, insulating layers, liquid crystal layers, controllers, displays, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all display devices and electronic devices practicable by an appropriate design modification by one skilled in the art based on the display devices and electronic devices described above as embodiments of the invention also are within the scope of the invention to the extent that the spirit of the invention is included.

Various variations and modifications can be conceived by those skilled in the art within the spirit of the invention, and it is understood that such variations and modifications are also encompassed within the scope of the invention.

For example, any addition, deletion, or design change of components, or any addition, omission, or condition change of processes in the above embodiments suitably made by those skilled in the art are also encompassed within the scope of the invention as long as they fall within the spirit of the invention.

Other working-effects derived from aspects described in the embodiments are interpreted to be naturally due to the invention as long as they are clear from the specification description or could have appropriately been made by a person skilled in the art.

What is claimed is:

1. A display device, comprising:
a switching liquid crystal unit;
a controller; and
a display,
the switching liquid crystal unit including:
a first polarizing layer,
a second polarizing layer,
a first substrate unit,
a second substrate unit, and
a liquid crystal layer,
the first substrate unit including:
a first substrate provided between the first polarizing layer and the second polarizing layer, the first substrate being light-transmissive and having a first surface intersecting a stacking direction, the stacking direction being from the first polarizing layer toward the second polarizing layer,
a plurality of inner electrodes provided between the first substrate and the second polarizing layer and arranged in a first direction, the first direction being in the first surface, the plurality of inner electrodes being light-transmissive,
an insulating layer provided between the first substrate and the plurality of inner electrodes, the insulating layer being light-transmissive, and
a plurality of outer electrodes provided between the first substrate and at least a portion of the insulating layer, the plurality of outer electrodes being light-transmissive, the plurality of outer electrodes and the plurality of inner electrodes being arranged alternately without overlapping each other when projected onto the first surface,
the second substrate unit including:
a second substrate provided between the first substrate unit and the second polarizing layer, the second substrate being light-transmissive, and
a counter electrode provided between the second substrate and the first substrate unit, the counter electrode being light-transmissive,
the liquid crystal layer being provided between the first substrate unit and the second substrate unit,
the controller being configured to control potentials of the plurality of inner electrodes, the plurality of outer electrodes, and the counter electrode,
the display overlapping the switching liquid crystal unit and being configured to emit light including a parallax image,
wherein, the plurality of inner electrodes includes a first electrode and a second electrode,
the plurality of outer electrodes includes a first middle electrode and a second middle electrode, the first middle electrode being most proximal to the first electrode among the plurality of outer electrodes, the second middle electrode being most proximal to the second electrode of the plurality of outer electrodes and different from the first middle electrode,
the first middle electrode is positioned between the first electrode and the second electrode when projected onto the first surface, the second electrode is positioned between the first middle electrode and the second middle electrode when projected onto the first surface,
the controller implements a first operation in a first period,
the first operation includes setting each of a first transmittance of the switching liquid crystal unit for light passing through the first electrode and a first middle transmittance of the switching liquid crystal unit for light passing through the first middle electrode to be higher than each of a second transmittance of the switching liquid crystal unit for light passing through the second electrode and a second middle transmittance of the switching liquid crystal unit for light passing through the second middle electrode.

2. The device according to claim 1, wherein
the controller further implements a second operation in a second period different from the first period, and
the second operation includes setting each of the second transmittance and the second middle transmittance to be higher than each of the first transmittance and the first middle transmittance.

3. The device according to claim 2, wherein
the controller acquires information relating to a spatial arrangement between the switching liquid crystal unit and a viewer, light passing through the switching liquid crystal unit being incident on the viewer, and
the controller implements the first operation when the arrangement is in a first state and implements the second operation when the arrangement is in a second state different from the first state.

4. The device according to claim 1, wherein the second electrode is the electrode of the plurality of inner electrodes most proximal to the first electrode.

5. The device according to claim 1, wherein
the plurality of inner electrodes further include a third electrode provided between the first electrode and the second electrode,
the plurality of outer electrodes include a third middle electrode different from the first middle electrode and the second middle electrode, the third middle electrode being the electrode of the plurality of outer electrodes most proximal to the third electrode,
the first middle electrode is positioned between the first electrode and the third electrode when projected onto the first surface, and the third electrode is positioned between the first middle electrode and the third middle electrode when projected onto the first surface, and
the first operation includes setting each of a third transmittance of the switching liquid crystal unit for light passing through the third electrode and a third middle transmittance of the switching liquid crystal unit for light passing through the third middle electrode to be higher than each of the second transmittance and the second middle transmittance.

6. The device according to claim 5, wherein
the plurality of inner electrodes further include a fourth electrode provided between the third electrode and the second electrode,
the plurality of outer electrodes include a fourth middle electrode different from the third middle electrode and the second middle electrode, the fourth middle electrode being the electrode of the plurality of outer electrodes most proximal to the fourth electrode,
the third middle electrode is positioned between the third electrode and the fourth electrode when projected onto the first surface, and the fourth electrode is positioned between the third middle electrode and the fourth middle electrode when projected onto the first surface, and the first operation includes setting each of a fourth transmittance of the switching liquid crystal unit for light passing through the fourth electrode and a fourth middle transmittance of the switching liquid crystal unit for light passing through the fourth middle electrode to be higher than each of the second transmittance and the second middle transmittance.

7. The device according to claim 1, wherein a width in the first direction of each of the plurality of inner electrodes is wider than a width in the first direction of each of the plurality of outer electrodes.

8. The device according to claim 1, wherein
the first operation includes setting each of a first absolute value of a potential difference between the first electrode and the counter electrode and a first middle absolute value of a potential difference between the first middle electrode and the counter electrode to be greater than each of a second absolute value of a potential difference between the second electrode and the counter electrode and a second middle absolute value of a potential difference between the second middle electrode and the counter electrode,
a second operation includes setting each of the second absolute value and the second middle absolute value to be greater than each of the first absolute value and the first middle absolute value, and
the first middle absolute value is greater than the first absolute value in the first operation.

9. The device according to claim 1, wherein
the first operation includes setting each of a first absolute value of a potential difference between the first electrode and the counter electrode and a first middle absolute value of a potential difference between the first middle electrode and the counter electrode to be less than each of a second absolute value of a potential difference between the second electrode and the counter electrode and a second middle absolute value of a potential difference between the second middle electrode and the counter electrode,
a second operation includes setting each of the second absolute value and the second middle absolute value to be less than each of the first absolute value and the first middle absolute value, and
the second middle absolute value is greater than the second absolute value in the first operation.

10. The device according to claim 1, wherein one of the plurality of outer electrodes is electrically connected to one of the plurality of inner electrodes.

11. The device according to claim 1, wherein
the first substrate unit includes a central unit and a peripheral unit, the peripheral unit being positioned on an outer side of the central unit in the first surface,
the first substrate unit further includes a plurality of connectors provided at the peripheral unit, and
one of the plurality of connectors electrically connects one of the plurality of outer electrodes to one of the plurality of inner electrodes.

12. The device according to claim 1, wherein
the first substrate unit further includes a plurality of interconnects provided between the first substrate and the second polarizing layer,
a sheet resistance of each of the plurality of interconnects is lower than a sheet resistance of each of the plurality of inner electrodes and lower than a sheet resistance of each of the plurality of outer electrodes, and
one of the plurality of interconnects electrically connects one of the plurality of inner electrodes to the controller.

13. The device according to claim 1, wherein a distance in the first direction between the first electrode and the first middle electrode is not more than $1/10$ of a width in the first direction of the first electrode when projected onto the first surface.

14. An electronic device, comprising: a display device, the display device including:
a switching liquid crystal unit;
a controller; and
a display,
the switching liquid crystal unit including:
a first polarizing layer,
a second polarizing layer,
a first substrate unit,
a second substrate unit, and
a liquid crystal layer,
the first substrate unit including:
a first substrate provided between the first polarizing layer and the second polarizing layer, the first substrate being light-transmissive and having a first surface intersecting a stacking direction, the stacking direction being from the first polarizing layer toward the second polarizing layer,
a plurality of inner electrodes provided between the first substrate and the second polarizing layer and arranged in a first direction, the first direction being in the first surface, the plurality of inner electrodes being light-transmissive,
an insulating layer provided between the first substrate and the plurality of inner electrodes, the insulating layer being light-transmissive, and
a plurality of outer electrodes provided between the first substrate and at least a portion of the insulating layer, the plurality of outer electrodes being light-transmissive, the plurality of outer electrodes and the plurality of inner electrodes being arranged alternately without overlapping each other when projected onto the first surface,
the second substrate unit including:
a second substrate provided between the first substrate unit and the second polarizing layer, the second substrate being light-transmissive, and
a counter electrode provided between the second substrate and the first substrate unit, the counter electrode being light-transmissive,
the liquid crystal layer being provided between the first substrate unit and the second substrate unit;
the controller being configured to control potentials of the plurality of inner electrodes, the plurality of outer electrodes, and the counter electrode; and
the display overlapping the switching liquid crystal unit and being configured to emit light including a parallax image,
wherein, the plurality of inner electrodes includes a first electrode and a second electrode,
the plurality of outer electrodes includes a first middle electrode and a second middle electrode, the first middle electrode being most proximal to the first electrode among the plurality of outer electrodes, the second middle electrode being most proximal to the second electrode among the plurality of outer electrodes and different from the first middle electrode, the first middle electrode is positioned between the first electrode and the second electrode when projected onto the first surface, the second electrode is positioned between the first middle electrode and the second middle electrode when projected onto the first surface, the controller implements a first operation in a first period, the first operation includes setting each of a first transmittance of the switching liquid crystal unit for light passing through the first electrode and a first middle transmittance of the switching liquid crystal unit for light passing through the first middle electrode to be higher than each of a second transmittance of the switching liquid crystal unit for light passing through the second electrode and a second middle transmittance of the switching liquid crystal unit for light passing through the second middle electrode.

* * * * *